United States Patent

Vajda

[11] Patent Number: 5,531,804
[45] Date of Patent: Jul. 2, 1996

[54] PLUNGER ASSEMBLY ADAPTER

[75] Inventor: Vladimir Vajda, Nussbaumen, Switzerland

[73] Assignee: Emhart Glass Machinery Investments Inc., Wilmington, Del.

[21] Appl. No.: 392,432

[22] Filed: Feb. 22, 1995

[30] Foreign Application Priority Data

Feb. 24, 1994 [GB] United Kingdom .................... 9403559

[51] Int. Cl.⁶ .................................................. C03B 11/06
[52] U.S. Cl. ............................ 65/362; 403/320; 403/362; 425/469
[58] Field of Search ............................. 65/362, 308, 317, 65/321, 375; 425/457, 469; 403/320, 362; 411/219, 286, 924, 937.2; 285/90, 92

[56] References Cited

U.S. PATENT DOCUMENTS

| 171,898 | 1/1876 | Wiles | 411/291 |
| 2,409,204 | 10/1946 | Gall | 411/291 |
| 3,667,525 | 6/1972 | Spieth | 403/320 |
| 4,130,162 | 12/1978 | Nelson | 285/92 |
| 4,585,467 | 4/1986 | Trahan et al. | 65/362 |

FOREIGN PATENT DOCUMENTS

| 0963723 | 7/1950 | France | 411/291 |
| 0982462 | 6/1951 | France | 411/291 |
| 70883 | 8/1946 | Norway | 403/320 |
| 595554 | 2/1978 | U.S.S.R. | 411/291 |
| 551534 | 2/1943 | United Kingdom | 411/291 |

Primary Examiner—William Beisner
Attorney, Agent, or Firm—Spencer T. Smith

[57] ABSTRACT

An adapter for use in securing a plunger assembly to a screw threaded upper end portion of a piston rod in a parison forming mechanism in a glassware forming machine has a sleeve with a wall portion which is provided with a strip supported only at spaced end portions thereof formed by two segmental slots in the wall portion and screw device for deflecting the strip to lock the adapter in position.

4 Claims, 2 Drawing Sheets

PLUNGER ASSEMBLY ADAPTER

The present invention is concerned with adapters for use in securing plunger assemblies in glassware forming machines.

BACKGROUND TO THE INVENTION

In glassware forming machines of the I.S. type there are two common modes of operation blow and blow and press and blow. These modes are distinguished by the method of formation of a parison in a parison mould, but both methods utilize a plunger which is forced into molten glass in the parison mould in the formation of the parison.

Plunger assemblies for parison formation are normally operated by a pneumatic piston and cylinder device, and the plunger assembly is attached to an upper end portion of a piston rod of the piston and cylinder device by use of an adapter comprising a sleeve having a wall portion with an internal threaded bore adapted to screw on to the upper end portion of the piston rod. It is essential that the adapter does not work loose while the machine is operating, because if it does so the height of the plunger in the machine may change, giving rise to defective ware. It is customary therefore for an operator to tighten the adapter onto the piston rod as much as possible. This gives rise to great problems when for example to change the plunger assembly, it is desired to remove the adapter during an operating run of the machine, partly because of the difficulty in obtaining a proper purchase on the adapter and partly because the parts of the machine are hot, and differential expansion can tighten the adapter even further.

It is an object of the present invention to provide an improved adapter.

BRIEF STATEMENT OF THE INVENTION

The present invention provides a plunger adapter for use in securing a plunger assembly to a screw threaded upper end portion of a piston rod in a parison forming mechanism in a glassware forming machine comprising a sleeve having a wall portion with an outer cylindrical surface and an internal threaded bore adapted to screw onto the upper end portion of said piston rod two segmental slots in the wall portion one of which overlies the other, each slot extending from the outer surface of said sleeve to the internal threaded bore, said slots thus providing a strip of the wall portion with inwardly facing threads which strip is supported only at spaced end portions thereof a screw threaded locking bore in the wall portion opening into one of the slots screw means in said locking bore adapted on tightening to bear on the strip, thus to deflect it and provide a locking action between the strip and the upper end portion of the piston rod.

Preferably in an adapter according to the invention the screw threaded locking bore has a longitudinal axis which is parallel to the axis of the internal threaded bore and opens onto an upper end face of the adapter.

There now follows a description, to be read with reference to the accompanying drawings, of two plunger assemblies each utilizing an adapter which embodies the invention.

BRIEF DESCRIPTION OF THE DRAWINGS

In the accompanying drawings

DESCRIPTION OF PREFERRED EMBODIMENTS

Figure 1:
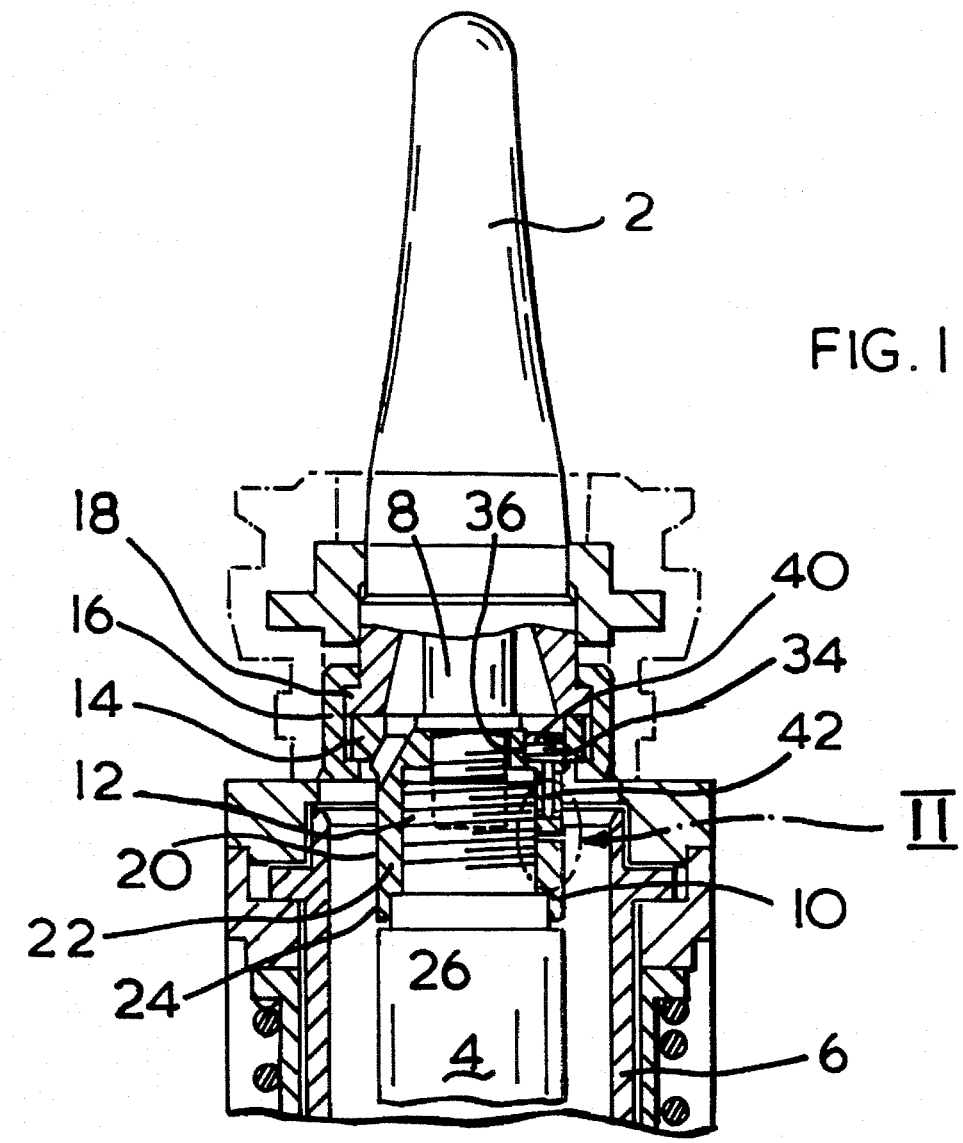
FIG. 1 shows an adapter embodying the invention when used with a plunger assembly for press and blow operation.
Figure 2:
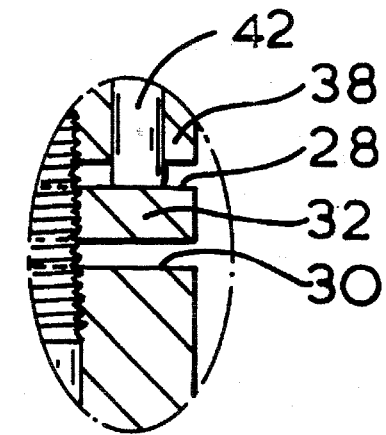
FIG. 2 shows part of FIG. 1 enlarged.

The plunger assembly shown, somewhat diagrammatically, in FIG. 1 is adapted for use in press and blow operation in the manufacture of glassware. The assembly comprises a plunger 2 which, in the operation of the assembly is moved up and down by the operation of a piston and cylinder device which comprises a piston (not shown) operating a piston rod 4 which moves in a cylinder 6. The piston rod 4 is hollow and cooling air is provided to the plunger through a pipe 8.

An adapter 10 secures the plunger assembly to a screw threaded upper end portion 12 of the piston rod 4. The adapter 10 comprises an outwardly extending upper flange 14 to which the plunger is secured by clamping members 16 which engage the flange 14 and a corresponding flange 18 on the plunger.

The adapter 10 comprises a sleeve 20 having a wall portion 22 with an outer cylindrical surface 24 and an internal threaded bore 26 which is screwed on to the upper end portion 12 of the piston rod 4.

Formed in the wall portion 22 are two overlying segmental slots 28,30. These slots extend from the outer surface 24 to the internal bore 26 thus to provide a strip 32 of the wall portion with inwardly facing threads, which strip is supported only at spaced end portions thereof.

Provided in the wall portion 22 with its axis parallel to the axis of the internal threaded bore 26 is a screw threaded locking bore 34 which comprises a wider, screw threaded portion 36 which opens onto an upper end face of the adapter and a narrower portion 38 which extends from the portion 36 to the slot 28, the axes of the two portions being parallel but offset from each other. A set screw 40 in portion 36 bears against a pin 42 in the portion 38, which pin rests against the strip 32.

When the plunger assembly is assembled, the adapter 10 is screwed by the operator onto the piston rod 4. When it has been fully screwed on the operator tightens the set screw 40 to push the pin 42 to bear against the strip 32. This deflects the strip to a small extent, and provides a locking action between the strip and the upper end portion of the piston rod 4. It will be understood that as the bore 34 opens onto the upper end face of the adapter, the set screw 40 is readily accessible to the operator. The plunger assembly can then be assembled in the usual way. When it is desired to remove the adapter 10, the operator slackens the set screw 40, thus removing the deflecting pressure from the strip 32. The adapter 10 can then be easily unscrewed from the rod 4.

Figure 3:
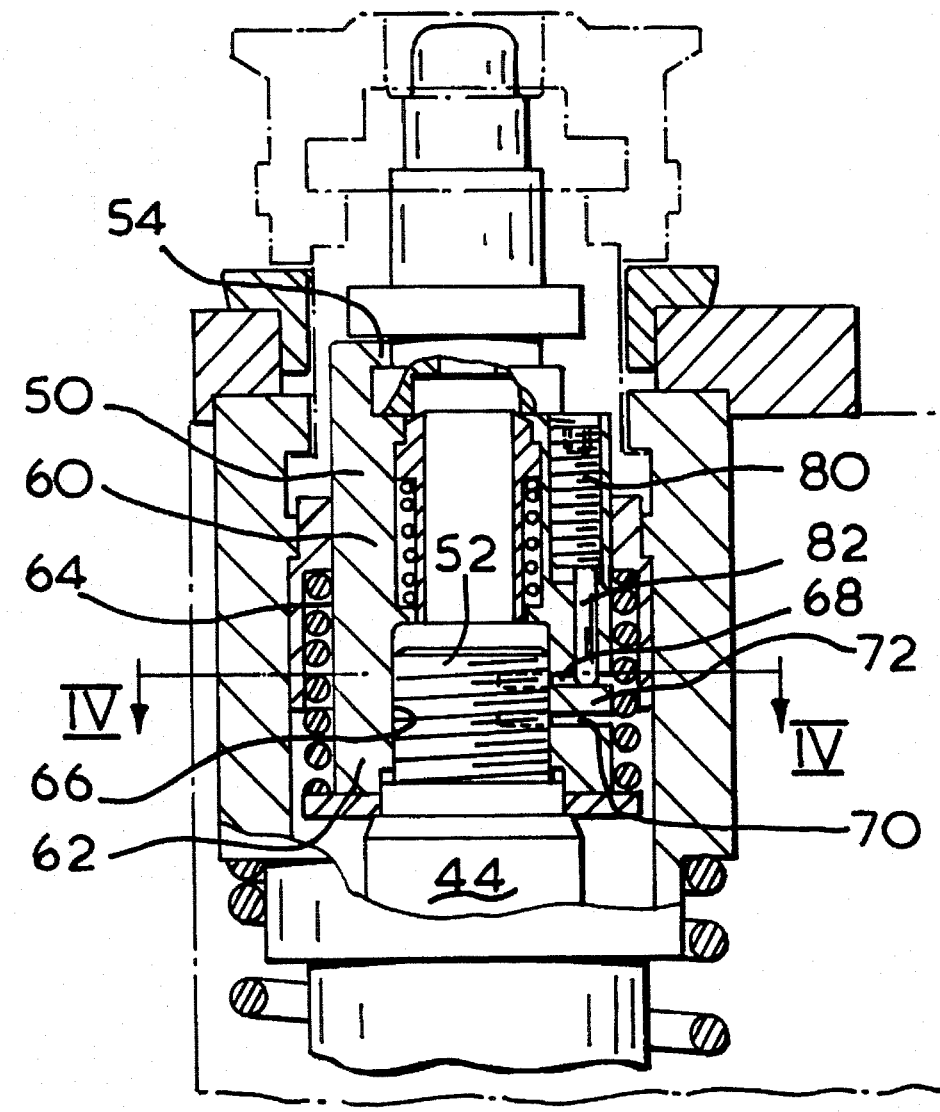
FIG. 3 shows an adapter embodying the invention when used with a second plunger assembly for blow and blow operation.
Figure 4:
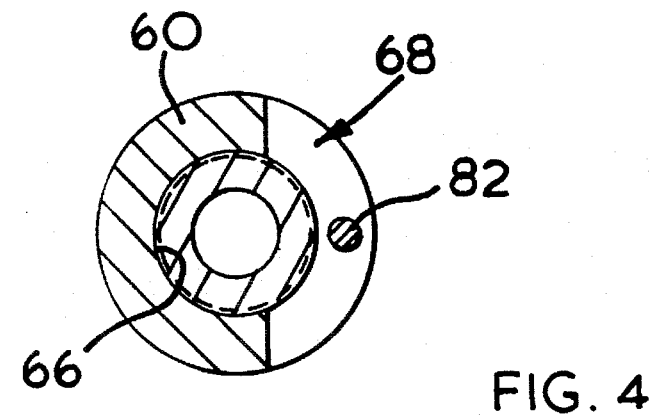
FIG. 4 shows a section on the line IV—IV of FIG. 3.

A second plunger assembly is shown, diagrammatically, in FIG. 3 and is adapted for use in blow and blow operation in the manufacture of glassware. This assembly will not be described in detail but is included to shown the use of an adapter according to the invention in a plunger assembly of this type.

In the second plunger assembly an adapter 50 secures the plunger assembly to a screw threaded upper end portion 52 of a piston rod 44. The adapter 50 comprises an inwardly extending upper flange 54 to which the assembly is secured. The adapter 50 comprises a sleeve 60 having a wall portion 62 with an outer cylindrical surface 64 and an internal threaded bore 66 which is screwed onto the portion 52. Formed in the wall portion 62 are two overlying segmental slots 68, 70 which extend from the outer surface 64 to the internal bore 66 thus to provide a strip 72 of the wall with inwardly facing threads, the strip 72 being supported only at spaced end portions thereof.

Provided in the wall portion 62 with its axis parallel to the axis of the internal bore 46 is a screw threaded locking bore 74 which comprises a wider, screw threaded portion 76 and a narrower portion 78 which extends from the portion 76 to the slot 68, the axes of the two portions 76,78 being parallel but offset from each other. A set screw 80 in the portion 76 bears against a pin 82 in the portion 78 which pin rests against the strip 72.

Use of the adapter 50 will be understood to be parallel to use of the adapter 10.

I claim:

1. A plunger adapter for use in securing a plunger assembly to a screw threaded upper end portion of a piston rod in a parison forming mechanism in a glassware forming machine comprising a sleeve having a wall portion with an outer cylindrical surface and an internal threaded bore adapted to screw onto the upper end portion of said piston rod two segmental slots in the wall portion one of which overlies the other, each slot extending from the outer surface of said sleeve to the internal threaded bore, said slots thus providing a strip of the wall portion with inwardly facing threads which strip is supported only at spaced end portions thereof a screw threaded locking bore in the wall portion opening into one of the slots screw means in said locking bore adapted on tightening to bear on the strip, thus to deflect it and provide a locking action between the strip and the upper end portion of the piston rod.

2. An adapter according to claim 1 wherein the screw threaded locking bore has a longitudinal axis which is parallel to the axis of the internal threaded bore and opens onto an upper end face of the adapter.

3. An adapter according to claim 2 wherein the screw means comprises a set screw in a screw threaded portion of the locking bore and a pin against which the set screw bears and which is slidably mounted in a narrower portion of the locking bore which extends from the screw threaded portion to said one slot.

4. A adapter according to claim 3 wherein the axes of the screw threaded portion and the narrower portion of the locking bore are parallel but offset from one another.

* * * * *